(12) United States Patent
Angelo

(10) Patent No.: US 10,675,748 B2
(45) Date of Patent: Jun. 9, 2020

(54) ELECTRONIC OUTDOOR MAINTENANCE DEVICE

(71) Applicant: Lawrence Angelo, North Arlington, NJ (US)

(72) Inventor: Lawrence Angelo, North Arlington, NJ (US)

( * ) Notice: Subject to any disclaimer, the term of this patent is extended or adjusted under 35 U.S.C. 154(b) by 0 days.

(21) Appl. No.: 16/456,259

(22) Filed: Jun. 28, 2019

(65) Prior Publication Data

US 2020/0001449 A1   Jan. 2, 2020

Related U.S. Application Data

(60) Provisional application No. 62/692,988, filed on Jul. 2, 2018.

(51) Int. Cl.

| | | |
|---|---|---|
| *B25G 3/02* | (2006.01) | |
| *A01D 7/00* | (2006.01) | |
| *A01B 1/02* | (2006.01) | |
| *E01H 5/02* | (2006.01) | |
| *F21V 21/088* | (2006.01) | |
| *H04R 1/02* | (2006.01) | |
| *H04R 1/40* | (2006.01) | |
| *H04R 3/12* | (2006.01) | |
| *G06F 3/14* | (2006.01) | |
| *B25G 1/10* | (2006.01) | |

(52) U.S. Cl.
CPC ............... *B25G 3/02* (2013.01); *A01B 1/02* (2013.01); *A01D 7/00* (2013.01); *E01H 5/02* (2013.01); *F21V 21/0885* (2013.01); *G06F 3/14* (2013.01); *H04R 1/028* (2013.01); *H04R 1/403* (2013.01); *H04R 3/12* (2013.01); *B25G 1/102* (2013.01); *H04R 2420/07* (2013.01)

(58) Field of Classification Search
CPC .. A01B 1/00; A01B 1/02; A01B 1/022; A01B 1/028; A01B 1/026; B25G 3/02; B25G 1/102; A01D 7/00; E01H 5/02; F21V 21/0885; H04R 1/028; H04R 1/403; H04R 3/12; H04R 2420/07; G06F 3/14
See application file for complete search history.

(56) References Cited

U.S. PATENT DOCUMENTS

| | | | | |
|---|---|---|---|---|
| 2,606,050 A | * | 8/1952 | Morris | A01B 1/00 |
| | | | | 403/328 |
| 4,162,132 A | * | 7/1979 | Kress | A01B 1/227 |
| | | | | 403/361 |
| 5,272,788 A | * | 12/1993 | Gilstrap | B25G 3/30 |
| | | | | 16/422 |

(Continued)

*Primary Examiner* — Stephen A Vu
(74) *Attorney, Agent, or Firm* — Boudwin Intellectual Property; Daniel Boudwin

(57) ABSTRACT

An electronic outdoor maintenance device. The device includes an elongated member that has a first end and a second end. A housing is attached to the first end of the elongated member. The housing defines an interior cavity. A controller s installed within the interior cavity. The controller includes a wireless transceiver to receive signals from a specified device. At least one speaker is placed on an external surface of the housing. The speaker is connected to the controller. The housing includes a handle to assist the user in operating the device. The second end of the elongated member has an interface that is designed to receive a working head of the user's choice.

7 Claims, 4 Drawing Sheets

(56) References Cited

U.S. PATENT DOCUMENTS

| | | | | |
|---|---|---|---|---|
| 6,669,397 B1* | 12/2003 | Christion | ................ | B25G 3/00 |
| | | | | 15/105 |
| 7,510,225 B1* | 3/2009 | Stinnett | .................... | A01D 9/00 |
| | | | | 15/405 |
| 8,550,516 B2 | 10/2013 | Best | | |
| 9,198,337 B2* | 12/2015 | Walsh | .................... | A01B 1/026 |
| 9,549,653 B1* | 1/2017 | Kapuriya | ............... | B65D 29/00 |
| 9,757,851 B2 | 9/2017 | Meinzer et al. | | |
| 9,775,271 B2 | 10/2017 | Bartnik | | |
| 9,828,734 B1* | 11/2017 | Bieberstein | ........... | E01H 1/1206 |
| 10,010,143 B2* | 7/2018 | Kong | ....................... | A45B 3/04 |
| 2010/0192738 A1 | 8/2010 | Fenstemaker | | |
| 2016/0374256 A1* | 12/2016 | Chou | ..................... | B25G 3/12 |
| | | | | 172/1 |
| 2017/0370058 A1 | 12/2017 | Herrera | | |

* cited by examiner

ELECTRONIC OUTDOOR MAINTENANCE DEVICE

CROSS REFERENCE TO RELATED APPLICATIONS

This application claims the benefit of U.S. Previsional Application No. 62/692,988 filed on Jul. 2, 2018. The above identified patent application is herein incorporated by reference in its entirety to provide continuity of disclosure.

BACKGROUND OF THE INVENTION

The present invention relates to an electronic outdoor maintenance device. More specifically, the present invention provides a multi-use and multi-function device designed to provide the convenience of electronic features with the functionality of an outdoor maintenance device.

Many people engage in outdoor maintenance. In the winter, an individual may be required to shovel snow from a driveway, a sidewalk or another asphalt or concrete surface. Additionally, the individual may be required to clear snow off of other surfaces, such as a motor vehicle. Not only do these activities provide safety in the form of reducing motor vehicle accidents or slips and falls, but this kind of outdoor maintenance can further increase the aesthetic appearance of the desired area. Winter is not the only season where an individual may wish to engage in outdoor maintenance. In the fall, an individual may be required to rake leaves from his or her lawn to prevent leaf build up. This task typically requires a rake or other tool capable of gathering and relocating fallen leaves. In the spring or the summer, an individual may engage in professional or recreational gardening. Several tools are required in order to garden effectively. For example, a gardener may utilize several shaped shovels, hoes or rakes. As such, there is a need for a multi-function, multi-use tool that is both effective for its individually contemplated goal while being efficiently removable and replaceable.

When engaging in outdoor maintenance activities, many individuals may find the activities to be dull or boring. As such, many individuals will utilize a device, such as a mobile phone to listen to music, podcasts or another form of entertainment media to pass the time while they are performing outdoor maintenance activities. There are several disadvantages to using a mobile phone in this manner. For example, the mobile phone may be subject to precipitation, such as rain, sleet, snow or hail, as well as excessive temperatures at warmer times of the year. Furthermore, the mobile device may require the use of headphones in order to hear the media. Headphones may become tangled when the individual wearing them is engaged in physical activity. This tangling may cause damage to not only the headphones, but potentially to the mobile device itself. As such, there is a need for an outdoor maintenance device that provides enhanced ability to utilize a media device, such as a mobile phone, while performing outdoor maintenance activities.

Some outdoor maintenance activities may need to be performed at night. For example, if snow falls at night, some areas, such as apartments or other group housing, may need maintenance performed during the evening hours. However, performing outdoor maintenance during evening hours can be dangerous due to low levels of light. Because most outdoor maintenance tools require the use of two hands, it is not practical to hold a flashlight or another light source while performing outdoor maintenance activities. Thus, there is a need amongst the known art for an outdoor maintenance device that provides light to improve visibility when engaged in outdoor maintenance activities at night or in low light conditions.

SUMMARY OF THE INVENTION

In view of the foregoing disadvantages inherent in the known types of outdoor maintenance devices now present in the known art, the present invention provides an outdoor maintenance device the same can be utilized for providing convenience for the user when performing outdoor maintenance activities.

The present device comprises an elongated member having a first end disposed oppositely of a second end. A housing is disposed on the first end of the elongated member. The housing defines an interior cavity. A controller is disposed within the interior cavity. The controller comprises a wireless transceiver in operable connection therewith. At least one speaker is disposed on an external surface of the housing. The at least one speaker is in operable connection with the controller. A handle is disposed on an external surface of the housing. The handle is disposed on the housing opposite of the elongated member. The second end of the elongated member defines an interface. The interface is configured to removably receive a working head thereon.

In one embodiment, it is an object of the present invention to provide a display on the external surface of the housing. The display is in operable connection with the controller such that information can be displayed thereon.

In another embodiment, it is an object of the present invention to provide a clip disposed between the first end of the elongated member and the second end of the elongated member, such that a flashlight can be removably mounted upon the elongated member. In another embodiment, the light is embedded upon the elongated member.

In further embodiments, it is contemplated that the working head is any head designed for a specific outdoor maintenance task. For example, the working head may be a snow shovel, a spade, a leaf rake or a bow rake. As such, the present invention is designed for multifunctional use as an outdoor maintenance tool.

In yet another embodiment, it is an object of the present invention to provide a grip disposed around the elongated member such as to assist the user in lifting or otherwise manipulating a targeted material with the working head.

In a further embodiment, it is an object of the present invention to provide a handle having at least one protrusion extending inwardly therefrom. As such, the handle is ergonomic providing ease of use to the user.

In yet a further embodiment, it is an object of the present invention to provide a speaker actuator that is in operable connection with the speakers of the present invention. As such, the user can turn the speakers on and off at his or her convenience.

In another embodiment, it is an object of the present invention to provide an interface that is threaded. As such, the user may easily attach and remove a working head at their convenience.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
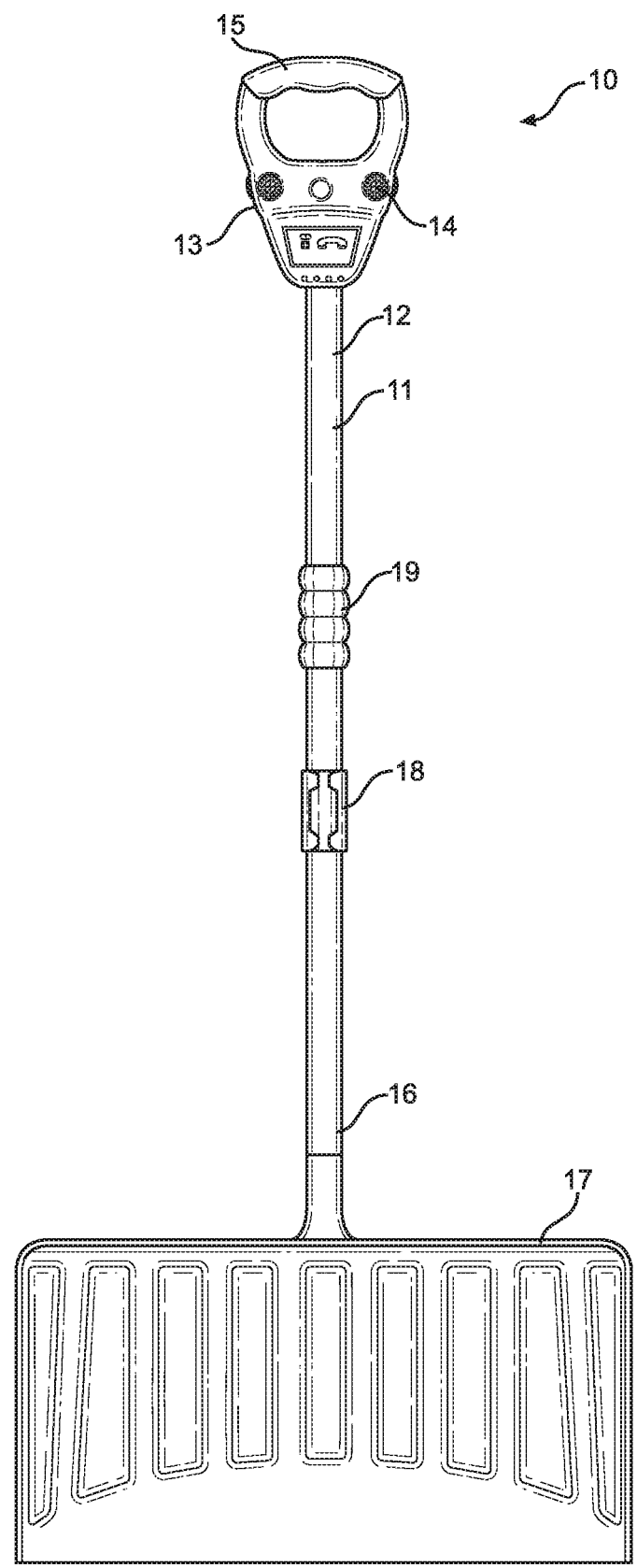
FIG. 1 shows a front view of an embodiment of the electronic outdoor maintenance device.

Reference is made herein to the attached drawings. Like reference numerals are used throughout the drawings to depict like or similar elements of the electronic outdoor maintenance device. The figures are intended for representative purposes only and should not be considered to be limiting in any respect.

Referring now to FIG. 1, there is shown a front view of an embodiment of the electronic outdoor maintenance device. The electronic outdoor maintenance device 10 comprises an elongated member 11 having a first end 12 disposed oppositely a second end 16. The elongated member 11 is made of a durable material that is suitable for the contemplated use. Ideally, the material is both durable and lightweight, such that the elongated member 11 will not give in to wear and tear, while also being lightweight so that any person may operate the electronic outdoor maintenance device 10.

A housing 13 is disposed on the first end 12 of the elongated member 11. The housing 13 defines an interior cavity. The housing 13 is made of a durable material, such that the housing 13 will not degrade when exposed to outdoor elements. Furthermore, the housing is ideally made of a lightweight material, such that the housing 13 will not contribute an excessive amount of weight to the electronic outdoor maintenance device 10. A controller is disposed within the internal cavity. The controller is configured to operate the elements that are in operable connection therewith. A more thorough discussion of the controller is provided in the discussion of FIG. 4 below.

At least one speaker 14 is disposed on an external surface of the housing 13. The at least one speaker 14 is configured to relay auditory signals that are transferred from the controller. The speaker 14, being disposed on the external surface of the housing 13 will emit the auditory signal, such that the user of the electronic outdoor maintenance device 10 will be able to hear the auditory signal. As such, the user is able to listen to an auditory signal, such as music or a podcast, while they are engaging in outdoor maintenance activities.

A handle 15 is disposed on an external surface on the housing 13. The handle 15 is disposed on the housing 13 at an opposite end of the elongated member 11. The handle 15 provides convenience to a user in that the handle 15 allows for easier and more effective manipulation of the electronic outdoor maintenance device 10. Furthermore, the handle 15 can provide assistance in storing the electronic outdoor maintenance device 10 if the user wishes to store the electronic outdoor maintenance device 10 on a hook or similar storage device. In the illustrated embodiment, handle 15 is defined by a plurality of parallel members with a perpendicular member extending therebetween, such that an aperture is defined therebetween. As such, the user will grasp the perpendicular member and place his or her fingers through the aperture.

The second end 16 of the elongated member 11 defines an interface. The interface is configured to removably receive a working head 17 thereon. The interface is of any suitable configuration for receiving the working head 17. For example, the interface may comprise a threaded interface, a snap-button interface, a finger groove interface or a locking clip interface. The working head 17 must be secured firmly upon the elongated member 11 such that the working head 17 may be utilized to perform outdoor maintenance activities, as required by the user.

In the illustrated embodiment, the elongated member 11 further comprises a clip 18. As shown, the clip 18 in this embodiment is configured to removably receive a flashlight therein. The clip is disposed on the elongated member 11 proximal to the second end 16 thereof. In some embodiments, the clip 18 is permanently mounted upon the elongated member 11. In other embodiments, the clip 18 is removably disposed on the elongated member 11, such as via a snap clasp fastener.

Additionally, in the illustrated embodiment, the elongated member 11 further comprises a grip 19 disposed thereon. The grip 19 is disposed on the elongated member 11 approximately a mid-point between the first end 12 and the second end 16 of the elongated member 11. The grip 19 is configured to provide an increased friction coefficient, such that the user will be provided with enhanced control over the electronic outdoor maintenance device 10. In one embodiment, the grip 19 is made of a rubberized material. Furthermore, in an alternative embodiment, the grip 19 comprises a cushioned material, such that comfort is provided to the hand of the user when the device is in use.

Figure 2:
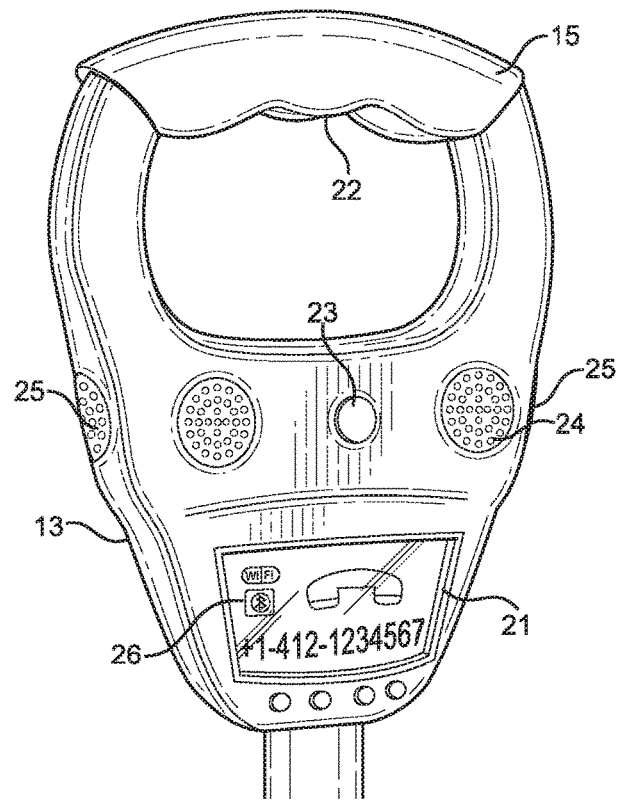
FIG. 2 shows a close-up view of a handle of an embodiment of the electronic outdoor maintenance device.

Referring now to FIG. 2, there is shown a close-up view of a handle of an embodiment of the electronic outdoor maintenance device. In the illustrated embodiment, the handle 15 defines at least one protrusion 22 extending herefrom. The protrusions 22 are configured to rise between the fingers of a user's hand. As such, the user will have greater control over the electronic outdoor maintenance device when operating the device using the handle 15.

In the illustrated embodiment, the electronic outdoor maintenance device further comprises a display 21 disposed on an external surface of the housing 13. In the illustrated embodiment, the display 21 is configured to provide a graphical user interface. The graphical user interface provides information relevant to the operation of the electronic outdoor maintenance device. In the shown embodiment, the graphical user interface provides a connection status display 26. As such, the user can tell if the wireless transceiver s engaged with a signal feed, such as a short-range data signal, like a mobile device, or a stronger signal, such as a WiFi connection. Additionally, in one embodiment, the graphical user interface provides a telephone display status. As such, when the electronic outdoor maintenance device is paired with a mobile device, the user can tell what mobile device that it is connected to and if the mobile device is currently engaged in a phone call.

Additionally, in the illustrated embodiment, the housing 13 comprises a speaker actuator 23 disposed on an external surface thereof. The speaker actuator 23 is in operable connection with a battery, such that the at least one speaker can be actuated and deactivated thereby. Furthermore, in the illustrated embodiment, the at least one speaker is defined by a pair of front speakers 24 disposed on the front surface of the housing 13 and a pair of side speakers 25 disposed on a pair of opposing sides of the housing 13. In the illustrated embodiment, the speaker actuator 23 is disposed between the pair of front speakers 24. The electronic components of the inventions are powered by a power source, such as a battery.

Figure 3:
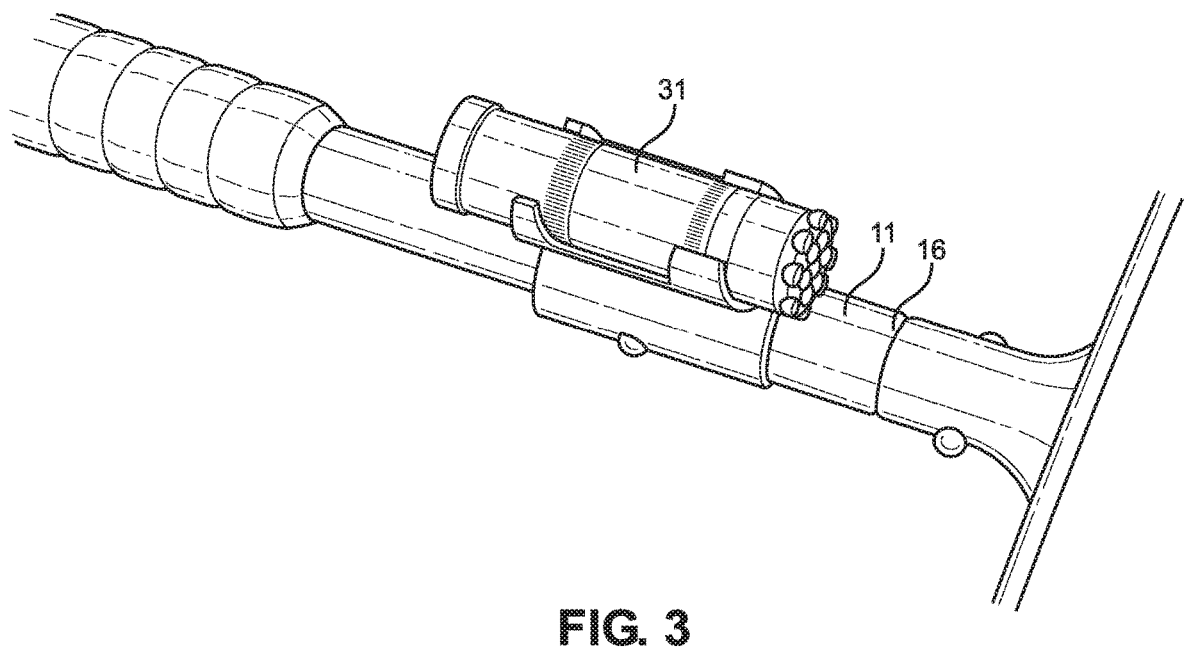
FIG. 3 shows a close-up view of an elongated member of an embodiment of the electronic outdoor maintenance device.

Referring now to FIG. 3, there is shown a close-up view of an elongated member of an embodiment of the electronic outdoor maintenance device. In the illustrated embodiment, the electronic outdoor maintenance device further comprises a light 31 disposed on the elongated member 11. The light 31 is positioned on the elongated member 11 proximal to the second end 16 thereof. In the illustrated embodiment, the light 31 is positioned such that a beam of the light is directed toward the second end 16 of the elongated member 11.

Figure 4:
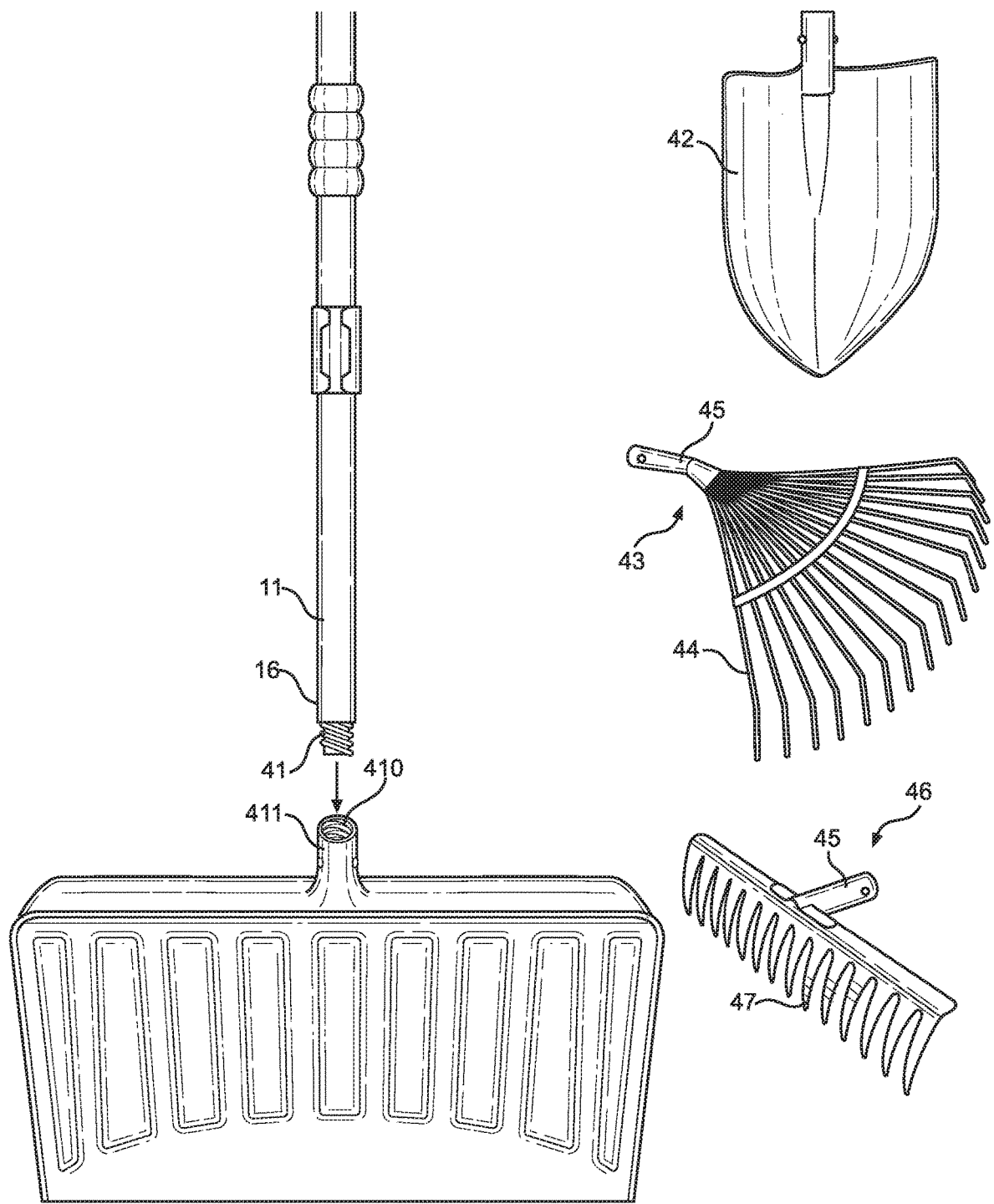
FIG. 4 shows a close-up view of an interface of an embodiment of the electronic outdoor maintenance device.

Referring now to FIG. 4, there is shown a close-up view of an interface of an embodiment of the electronic outdoor maintenance device. In the illustrated embodiment, the interface is a threaded interface comprising a male threading 41 disposed on a second end 16 of the elongated member 11. The male threading 41 is configured to correspond with a female threading 410 disposed on the working head 17. In the illustrated embodiment, the female threading 410 is disposed within a cavity formed by a hollowed pole 411 extending from the working head.

The working head may be of any desired construction suitable for outdoor maintenance activities. In one embodiment, the working head is a snow shovel 41. In another embodiment, the working head is a spade 42. In a further embodiment, the working head is a lawn rake 43 defining a plurality of tines 44 extending forward and downward from a base portion 45 thereof. In yet another embodiment, the working head is a bow rake 46 defining a plurality of spikes 47 extending from a base rod 48.

Figure 5:
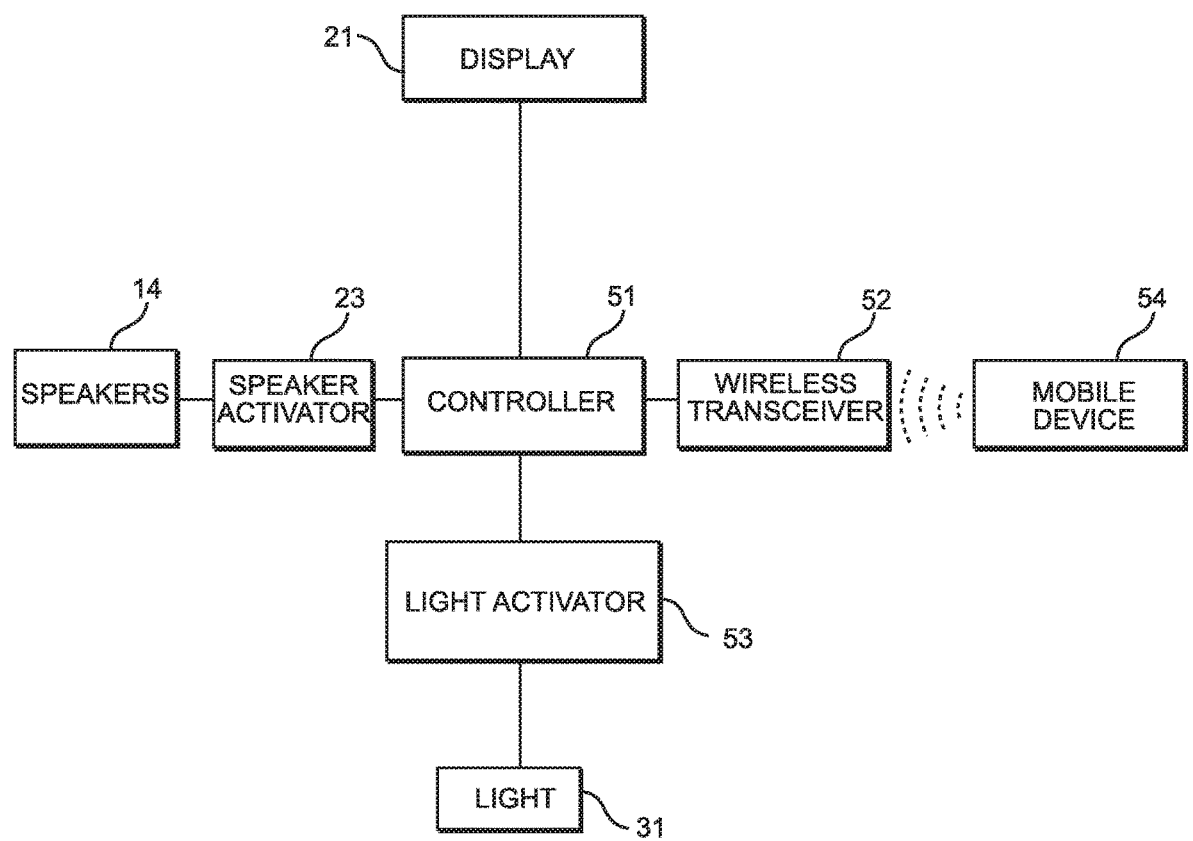
FIG. 5 shows a block diagram of an embodiment of the electronic outdoor maintenance device.

Referring now to FIG. 5, there is shown a block diagram of an embodiment of the electronic outdoor maintenance device. The controller 51 is disposed within the interior cavity of the housing. The controller 51 is in operable connection with a wireless transceiver 52. The wireless transceiver 52 is configured to communicate with a computing device, such as a mobile device 54. As such, data can be transmitted from the mobile device 54 to the controller 51 via the wireless transceiver 52. This allows the user to be able to perform various functions of the mobile device 54 through the controller 51, such as making phone calls, listening to audio received from the mobile device 54, or other functions.

In one embodiment, the controller 51 is in operable connection with the display 21. As such, information gathered and stored in the controller 51 may be presented by the display 21. Furthermore, when a mobile device 54 is paired with the controller 51 via the wireless transceiver 52, data stored on the mobile device 54 may be displayed on the display 21.

In some embodiments, the speakers 14 and the light 31 may be activatable. As such, a speaker activator 23 may be engaged or disengaged, such that the speaker 14 will be, in turn, engaged or disengaged. Additionally, a light activator 53 may be engaged or disengaged, such that the light 31 will be, in turn, engaged or disengaged. The speaker activator 23 and the light activator 53 provide convenience to the user, as energy can be saved from constantly powering the device.

It is therefore submitted that the instant invention has been shown and described in various embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:
1. An electronic outdoor maintenance device, comprising:
  an elongated member having a first end disposed oppositely a second end;
  a housing disposed on the first end of the elongated member;
  the housing defining an interior cavity;
  a controller disposed in the interior cavity;
  the controller comprising a wireless transceiver;
  a pair of front speakers disposed on a front surface of the housing;
  a pair of side speakers disposed on a pair of opposing side surfaces of the housing;
  a speaker actuator disposed between the pair of front speakers on the front surface of the housing;
  a display disposed on an external surface of the housing;
  the display in operable connection with the controller;
  the display configured to provide a graphical user interface;
  the graphical user interface comprising a connection status display;
  the graphical user interface comprising a telephone status display;
  a handle integrally disposed on an external surface of the housing;
  the handle disposed opposite of the elongated member;
  at least one light disposed on the elongated member between the first end and the second end thereof;
  wherein the at least one light is positioned such that a beam is directed toward the second end of the elongated member;
  a grip disposed on the elongated member between the at least one light and the housing;
  the second end of the elongated member defining an interface;
  the interface configured to removably receive a working head thereon.
2. The electronic outdoor maintenance device of claim 1, wherein the working head is a snow shovel.
3. The electronic outdoor maintenance device of claim 1, wherein the working head is a spade shovel.
4. The electronic outdoor maintenance device of claim 1, wherein the working head is a rake defining a plurality of tines extending parallel from a base.
5. The electronic outdoor maintenance device of claim 1, wherein the working head is a bow rake defining a plurality of tines extending perpendicularly from a base.
6. The electronic outdoor maintenance device of claim 1, wherein the handle comprises at least one protrusion thereon.
7. The electronic outdoor maintenance device of claim 1, wherein the interface is a threaded interface comprising a male threading configured to correspond to a female threading disposed within a receiving port defined by the working head.

\* \* \* \* \*